United States Patent
Perkins et al.

(10) Patent No.: US 10,969,166 B2
(45) Date of Patent: Apr. 6, 2021

(54) INSERT FOR HARD COOLER

(71) Applicant: Eugene D. Perkins, Highlands Ranch, CO (US)

(72) Inventors: Eugene D. Perkins, Highlands Ranch, CO (US); Brandon J. Blair, Denver, CO (US); Shane J. Korthuis, Denver, CO (US); Peter S. Livingston, Denver, CO (US); Dusty R. Terry, Denver, CO (US); Marc A. Hanchak, Denver, CO (US)

( * ) Notice: Subject to any disclaimer, the term of this patent is extended or adjusted under 35 U.S.C. 154(b) by 48 days.

(21) Appl. No.: 16/244,997

(22) Filed: Jan. 10, 2019

(65) Prior Publication Data
US 2019/0212057 A1    Jul. 11, 2019

Related U.S. Application Data

(60) Provisional application No. 62/615,845, filed on Jan. 10, 2018.

(51) Int. Cl.
*F25D 31/00* (2006.01)
*F25D 3/08* (2006.01)
*F25D 25/00* (2006.01)

(52) U.S. Cl.
CPC .......... *F25D 31/007* (2013.01); *F25D 25/00* (2013.01); *F25D 3/08* (2013.01); *F25D 2331/805* (2013.01); *F25D 2331/809* (2013.01)

(58) Field of Classification Search
CPC .... F25D 31/007; F25D 3/08; F25D 2331/805; F25D 25/00; F25D 2331/809
See application file for complete search history.

(56) References Cited

U.S. PATENT DOCUMENTS 4,551,988 A * 11/1985 Petrantoni ................. F25D 3/06
                                                           62/457.1
5,437,165 A *  8/1995 White .................... A45C 11/20
                                                           62/465

(Continued)

*Primary Examiner* — Frantz F Jules
*Assistant Examiner* — Lionel Nouketcha
(74) *Attorney, Agent, or Firm* — Samuel M. Freund; Cochran Freund & Young LLC

(57) ABSTRACT

A cooler insert for placement into a portable hard cooler or ice chest for separating sandwiches, lunch meats, cheese, vegetables, and the like, and drinks from the materials used to cool these items, is described. Many commercially available portable coolers have rectangular-shaped cooling volumes with at least two of the opposing walls forming a horizontal ledge inside the cooling volume parallel to and below the opening thereof upon which the present cooler insert is supported. The present cooler insert includes three adjacent chambers, a first chamber for containing food items to be cooled, a second chamber for containing clean ice for use for cooling drinks; and a third chamber, having cylindrically-shaped compartments tapered toward the bottom, for holding cans or bottles. Bottom portions of the first two chambers may be formed using aluminum or other conductive metal plates covered with plastic, or using uncoated metal plates for improving conduction to the cooler insert from the cooler. The open top portions of the first and second chambers may be covered with a removable plastic or metal cover, which may also be used as a cutting board, when attached to the side of the cooler.

3 Claims, 10 Drawing Sheets

(56) References Cited

U.S. PATENT DOCUMENTS

| | | | |
|---|---|---|---|
| 8,894,030 B2* | 11/2014 | Nixon | A47G 23/0225 248/311.2 |
| 9,631,860 B2* | 4/2017 | Gossens | A47F 3/0426 |
| 2003/0168371 A1* | 9/2003 | Weimer | B65D 81/3813 206/457 |
| 2003/0173361 A1* | 9/2003 | Lee | B65D 25/04 220/23.88 |
| 2015/0128637 A1* | 5/2015 | Peters | F25D 31/007 62/457.4 |

* cited by examiner

INSERT FOR HARD COOLER

CROSS-REFERENCE TO RELATED APPLICATIONS

The present application claims the benefit of U.S. Provisional Patent Application No. 62/615,845 for "INSERT FOR HARD COOLER" which was filed on Jan. 10, 2018, the entire content of which is hereby specifically incorporated by reference herein for all that it discloses and teaches.

BACKGROUND

Portable food and beverage coolers, or ice chests, are ubiquitous in the modern world. They are found in campgrounds, parking lots for sports arenas, on pleasure boats, and at beaches, to name a few locations. Often, reusable blocks or packages containing refrigerant, which are cooled or frozen before use, are used to maintain the cooler well below ambient temperature, but most often water ice is utilized.

Generally, food is wrapped with or sealed in waterproof material, such as resealable plastic bags, and placed in the ice, as are beverage bottles and cans. After repeated unwrapping and wrapping of the food, however, the surfaces of the wrapping material in contact with the ice often become coated with food, which is then introduced into the ice. This ice can then no longer be used for direct contact with food or for adding to beverages, and bottles and cans must be wiped clean before opening and drinking therefrom.

Moreover, when food and beverages are kept cold by placing them in the ice in the coolers or ice chests, it may be difficult to locate a desired beverage or food, and to determine the inventory of items being kept cool.

Rotational molding, rotomolding, or rotocasting is a cost-effective production process for forming hollow plastic parts having various sizes. Resins are placed into a mold that is heated and simultaneously rotated slowly, both vertically and horizontally, which distributes and fuses the resin on the inner surfaces of the mold. The resulting product has seamless parts with a uniform wall thickness having more material in the corners to absorb shocks and stresses where they occur most. Many hard coolers or ice chests are formed in this manner.

SUMMARY

In accordance with the purposes of embodiments of the present invention, as embodied and broadly described herein, embodiments of the apparatus hereof include an insert for placement into a portable hard cooler or ice chest effective for separating sandwiches, lunch meats, cheese, vegetables, and the like, and drinks from the materials used to cool these items, such as ice, as an example, while permitting the food and drink items to be effectively cooled.

Benefits and advantages of embodiments of the present invention include, but are not limited to, providing compartments containing items to be kept cool disposed in a hard cooler, whereby the food and drink to be kept cool, and the cooling materials of the hard cooler are sufficiently separated that the cleanliness of the food and drink, and that of the cooling materials are maintained, and the contents of the hard cooler can readily be determined.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A, a schematic representation of a side perspective view of an embodiment of the cooler insert of the present invention, while

FIG. 3B is a schematic representation of a side view of the cooler insert, while

FIG. 5A is a schematic representation of a perspective bottom view of the second lid illustrated in FIG. 4A hereof, showing tabs for securing the second lid to the top of the present cooler insert, finger depressions for assisting a user in raising and removing the second lid, storage slots for storing the attachment/support member, and a receptacle for the attachment/support member, while

FIG. 6A is a schematic representation of a perspective top view of the attachment/support member inserted into one of the tie-down slots of portable cooler, while

DETAILED DESCRIPTION

Figure 1:
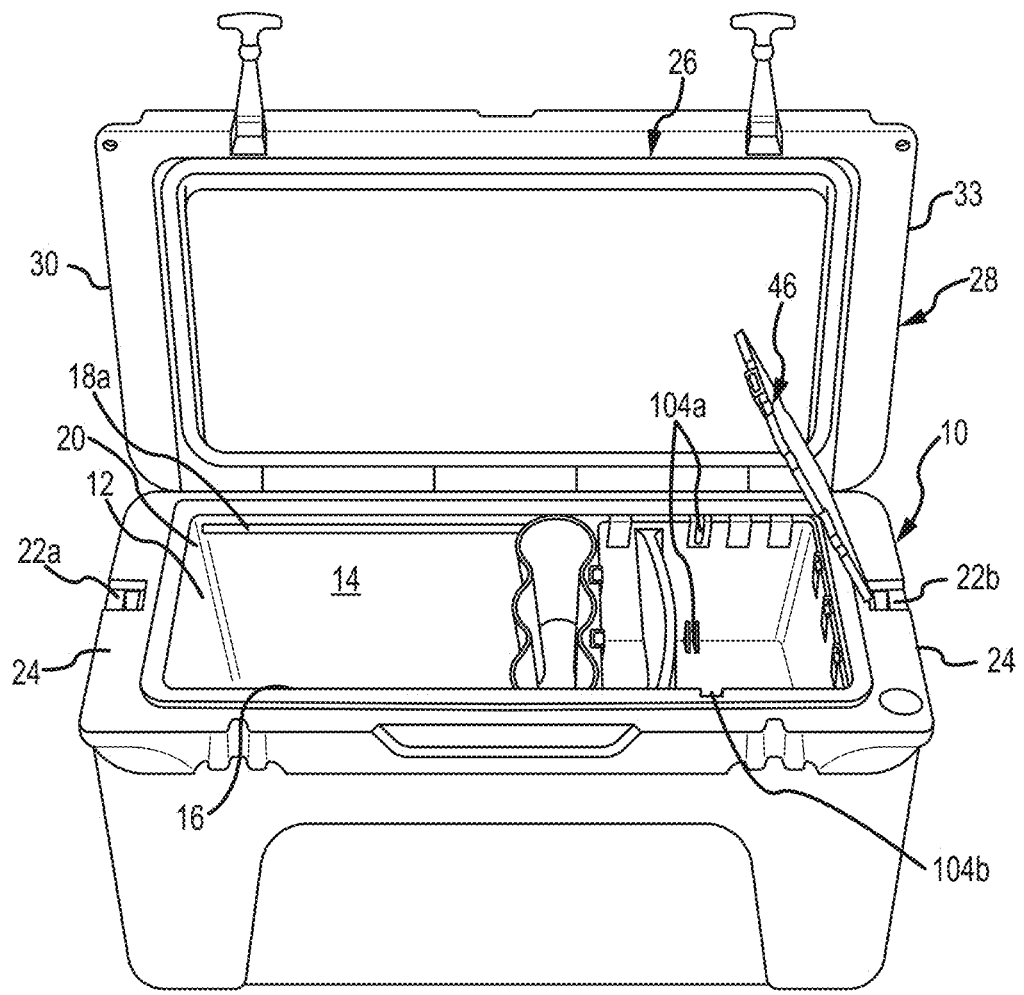
FIG. 1 is a schematic representation of a top front perspective view of a commercially available, one-piece, rotationally molded, portable cooler having a rectangular-shaped cooling volume with at least two of the opposing walls having horizontal ledges for supporting the cooler insert of the present invention, and molded tie-down slots formed through a lip or flange at the top of the cooler opening and disposed outside of an air-tight gasket in the lid.

Briefly, embodiments of the hard cooler insert of the present invention include an insert for placement into a portable hard cooler or ice chest for separating sandwiches, lunch meats, cheese, vegetables, and the like, and drinks from the materials used to cool these items, such as ice, as an example. As illustrated in FIG. 1, many commercially available, one-piece, rotationally molded, portable coolers, 10, have rectangular-shaped cooling volumes, 12, with at least two of the opposing walls, 14, 16, having thickened portions forming a horizontal ledge, 18a, (ledge 18b not being shown in FIG. 1, but faces ledge 18a) on each of these walls, inside cooling volume 12 parallel to and below opening, 20, thereof. Additionally, many such coolers have molded tie-down slots, 22a, 22b, formed through first lip or flange, 24, at the top of the cooler opening and disposed outside of air-tight gasket, 26, in lid, 28, of cooler 10, and covered by second lip or flange, 30, in lid 28, when closed. First lip 24 either partially or totally surrounds the cooler opening, and may be used as a grip handle for carrying cooler 10. Tie-down slots 22a and 22b do not interfere with the closing of lid 28. An embodiment of insert, 32, of the present invention is shown disposed in cooling volume 12, and will be described in detail in what follows.

Embodiments of the present insert include three attached chambers or compartments, either adjacent or spaced apart at chosen distances, a first chamber for containing food items to be cooled, having four seamless walls, a first bottom member, seamlessly attached to the walls, for providing liquid isolation between the interior of the first chamber and the cooled volume of the cooler, and an open top portion defined by the walls; a second chamber for containing clean ice to be used for cooling drinks, as an example, having four seamless walls, with the wall of the second chamber facing the first chamber being spaced-apart a chosen first distance from the opposing wall of the first chamber to permit more effective cooling of both chambers, a second bottom member, seamlessly attached to the walls, for providing liquid isolation between the interior of the second chamber and the cooled volume of the cooler, and an open top portion defined by the walls; and a third chamber, having vertically oriented cylindrically-shaped compartments tapered toward the bottom, open at the top and bottom, and spaced-apart a second chosen distance from the second chamber, again to permit more effective cooling, for holding cans or bottles. In some embodiments, the cylindrically-shaped compartments of the third chamber have a vertical slot formed therein to improve access of the cans and bottles to a user.

A second lip or flange is formed near the top of the cooler insert, and adapted for resting on the horizontal ledges of the cooler.

Additionally, the first bottom member and the second bottom member may be formed using aluminum or other thermally conductive metal plates covered with plastic during the molding process for improving conduction to the cooler insert from the cooler. The first bottom member and the second bottom member may be substantially planar and the metal plates may be approximately coextensive therewith. The open portions of the first and second chambers may be covered with a removable plastic cover, which may also be used as a cutting board and, as will be described in more detail below, may be secured to the cooler by use of the tie-down slots and the lid of the cooler. A second cutting board, also mountable on the cooler by use of the tie-down slots and cooler lid, may be stored in a slot in the first chamber, serving as a compartment divider. Clean ice stored in the second chamber, adds cooling capacity to the cooler.

The height of the vertical walls and the volumes of the cooler insert chambers are chosen such that effective cooling from the hard cooler of the contents of the present cooler insert is maintained.

Polyethylenes and cross-linked polyethylenes are the most widely used materials for rotational molding. Other materials used in rotational molding include: polyvinyl chloride, nylon, polycarbonate, polyester, and polypropylene, as examples. These materials may be used for the molding process of the cooler insert of the present invention as well. Injection molding may be used to form seamless or otherwise waterproof walls and bottom members for the present cooler insert, but in some embodiments, the walls and bottom members may be attached to each other using epoxy, glue, plastic cement, or other plastic fastening compositions to achieve watertight compartments.

Figure 2A:
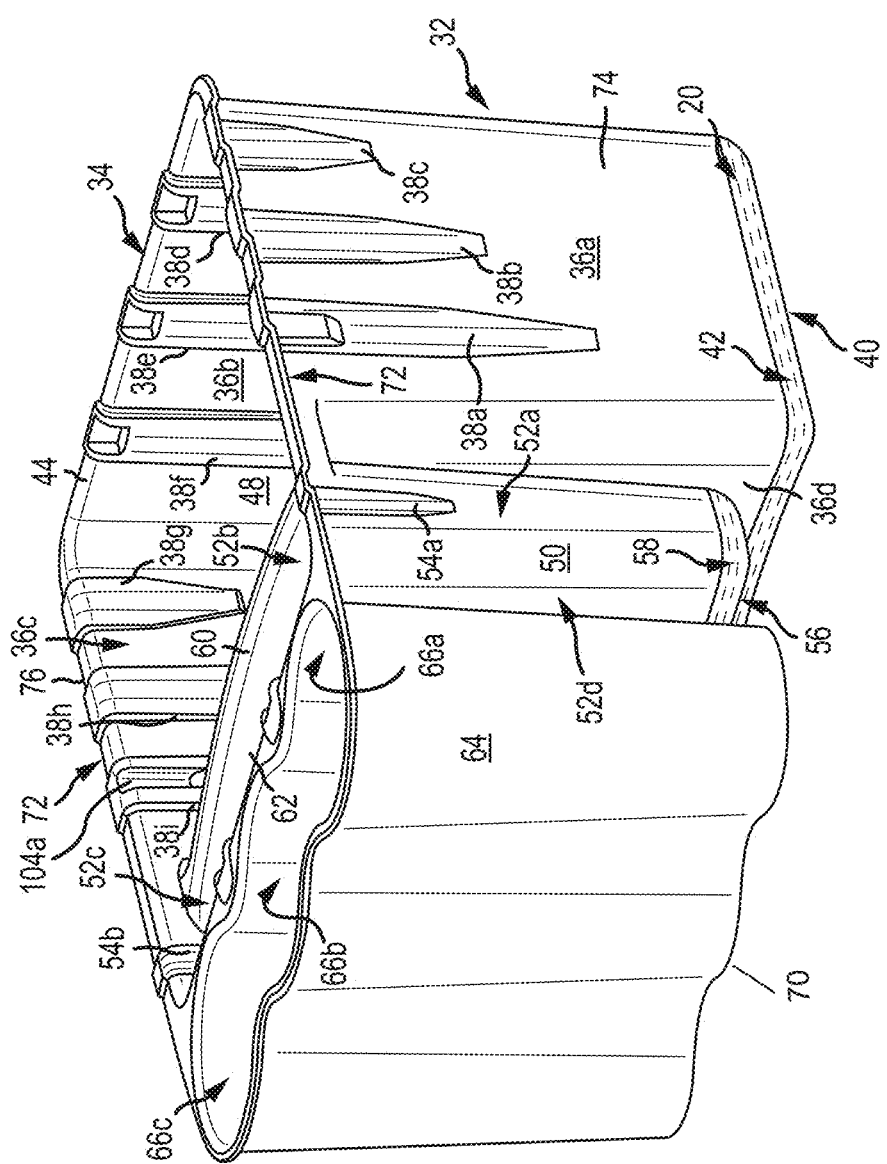

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning now to FIG. 2A, a schematic representation of a side perspective view of an embodiment 32 of the cooler insert of the present invention is illustrated. Shown are a watertight first chamber, 34, having four seamlessly formed walls shown as planar, approximately vertical walls, 36a-36d, with ribbed portions or flutes, 38a-38i, included for adding strength and rigidity to cooler insert 32. First bottom member, 40, formed during the injection molding process completes the watertight first chamber 34.

As mentioned above, first bottom member 40 may contain a metal plate, 42, at least partially covered with the plastic material of the present cooler insert to improve conduction to and from the cooler into which the cooler insert is placed. That is, metal plate 42 may be attached to first bottom member 40 by an epoxy, glue, plastic cement, or adhesive, and left uncoated on the face thereof away from the cooler insert, or fully covered in the molding process for the cooler insert, depending on the molding process employed. FIG. 2A shows metal plate 42 fully encased in plastic.

Top portion, 44, of first chamber 32 is open and, when covered by second lid, 46, shown in FIG. 1, and to be described below, gives first chamber 32 a first volume, 48.

Second watertight chamber, 50, having four seamlessly formed walls shown as planar, approximately vertical walls, 52a-52d, with ribbed portions or flutes, 54a-54b, included for adding strength and rigidity to cooler insert 32. Second bottom member, 56, formed during the injection molding process completes the watertight first chamber 50. As for first chamber 34, second bottom member 56 may contain a metal plate, 58, at least partially covered with the plastic material of the present cooler insert to improve conduction to and from the cooler into which the cooler insert is placed. That is, metal plate 58 may be attached to second bottom member 56 by an epoxy, glue, plastic cement, or adhesive, and left uncoated on the face thereof disposed away from the present cooler insert, or fully covered in the molding process for the cooler insert, depending on the molding process employed. FIG. 2A shows metal plate 58 fully encased in plastic.

Top portion, 60, of second chamber 50 is open, and, when covered with second lid 46, shown in FIG. 1, gives second chamber 50 has a second volume, 62.

Third chamber, 64, is illustrated in FIG. 2A as having three cylindrical tubular sections, 66a-66c, tapered down from open top, 68, of chamber 64 to the open bottom, 70, thereof, that is, cylindrical sections 66a-66c are smaller in diameter at bottom 70. Chamber 64 is adapted to hold drink cans and bottles for cooling, while preventing them from slipping into the cooling volume of portable cooler 10.

Second lips or flanges, 72a and 72b, are formed on the top surface of cooler insert 32, on two opposing sides thereof, 74, 76, respectively, extending at least between first chamber 34 and second chamber 50, and preferably, but not necessarily, to third chamber 64, and adapted to rest on first lip 18 of cooler 10.

Figure 2B:
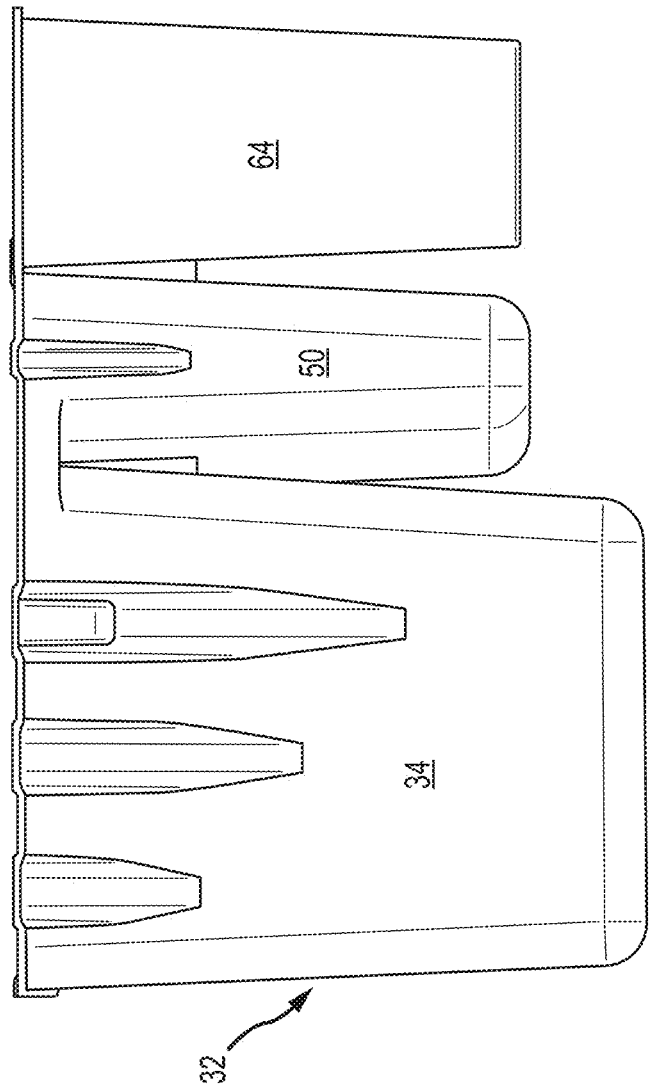
FIG. 2B is a schematic representation of a side view thereof.
Figure 2C:
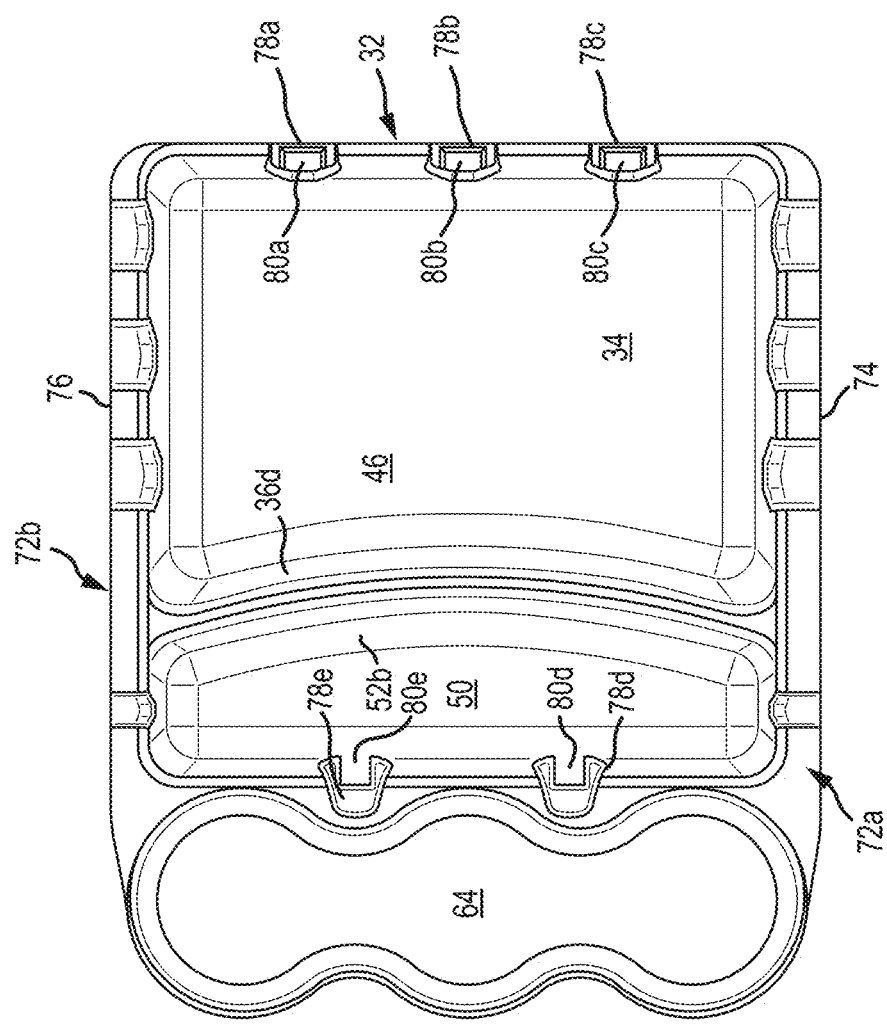
FIG. 2C illustrates a top view thereof.

FIG. 2B is a schematic representation of a side view of cooler insert 32, illustrated in FIG. 2A hereof, and FIG. 2C illustrates a top view thereof. FIG. 2C shows slots 78a-78e for accommodating tabs 80a-80e formed in second lid 46, as will be shown in more detail in what follows. It is to be noted that the embodiment of the present cooler insert illustrated in FIG. 2C shows walls 36d and 52b having curvature.

Figure 3A:
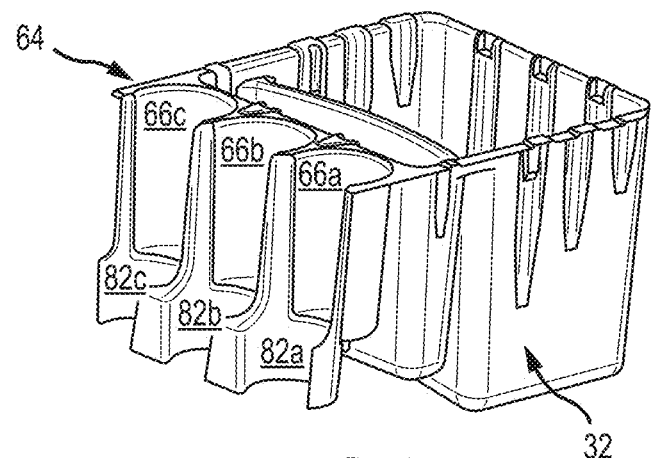
FIG. 3A is a schematic representation of another embodiment of the cooler insert of the present invention, illustrating the tapered cylindrical walls of the third chamber of this embodiment having axial openings and additional open tapered cylindrical sections, for enabling cans and bottles disposed therein to be more readily accessed by a user, while keeping the cans and bottles cool without falling into the cooling volume of portable cooler.
Figure 3B:
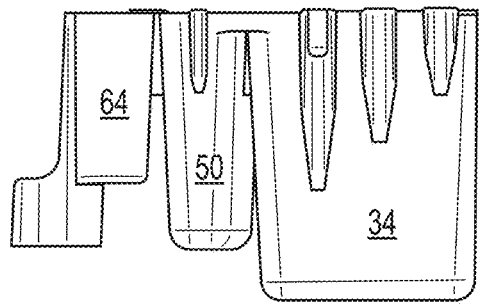
Figure 3C:
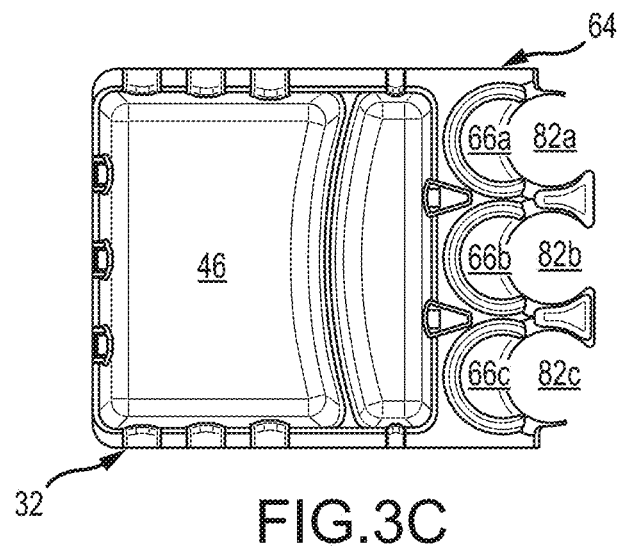
FIG. 3C is a schematic representation of a top view thereof.

FIG. 3A is a schematic representation of a perspective side view of another embodiment of the cooler insert of the present invention, illustrating the tapered cylindrical walls 62a-62c of third chamber 64 of this embodiment, having axial openings with additional open tapered cylindrical sections, 82a-82c, for enabling cans and bottles disposed therein to be more readily accessed by a user, while keeping the cans and bottles cool without falling into the cooling volume of portable cooler 10. FIG. 3B is a schematic representation of a side view of cooler insert 32, while FIG. 3C is a schematic representation of a top view thereof.

Figure 4A:
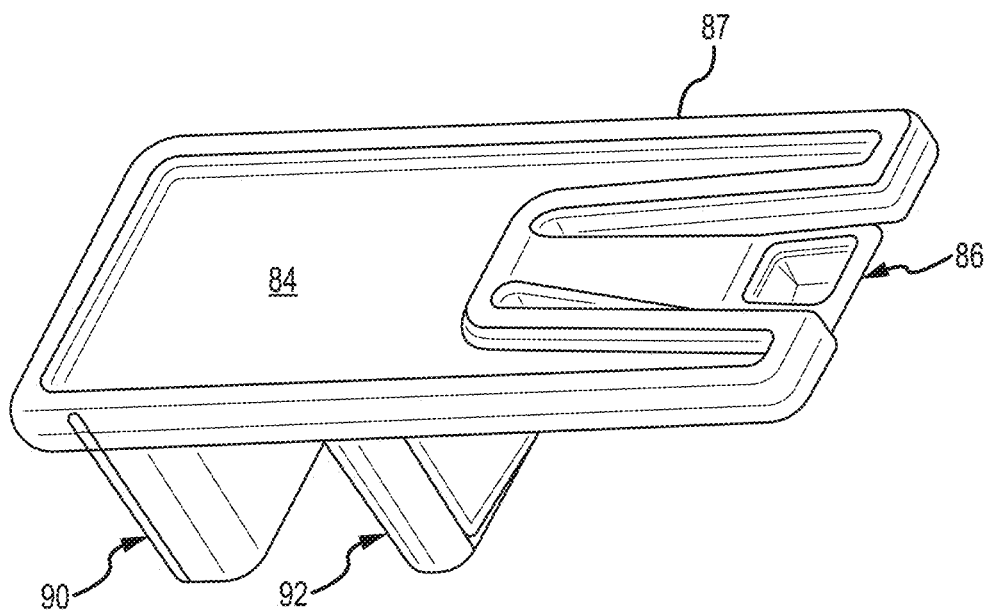
FIG. 4A is a schematic representation of a perspective top view of an attachment/support member for reversibly affixing a second lid to either of the molded tie-down slots of the portable cooler such that the second lid may be used as a cutting board.
Figure 4B:
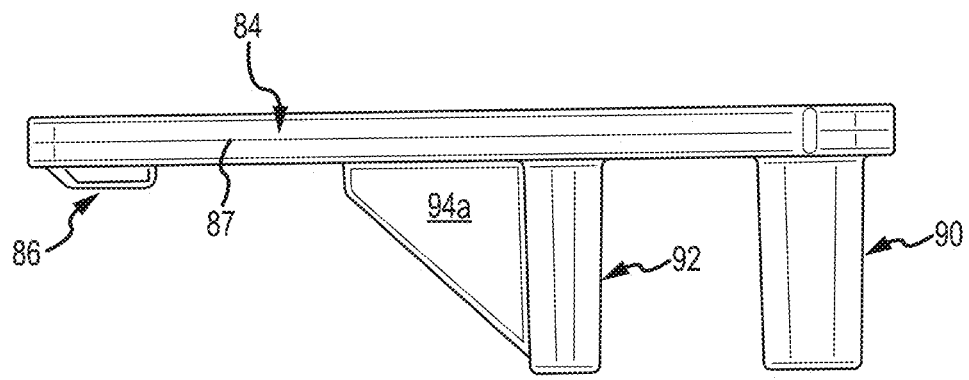
FIG. 4B is a schematic representation of a side view of the attachment/support member illustrating optional braces, which may be added to stabilize the attachment/support member.
Figure 4C:
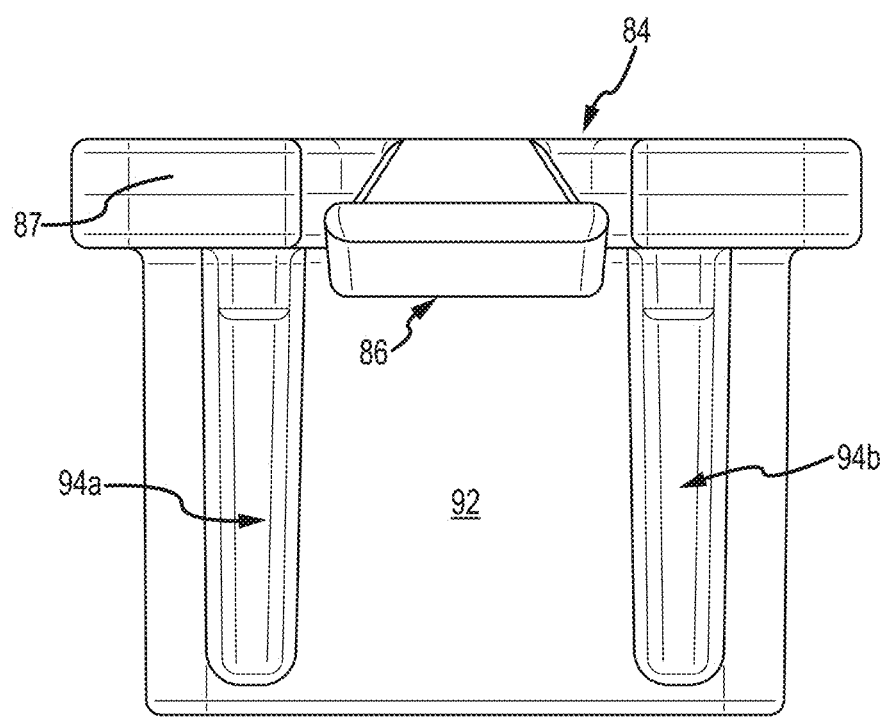
FIG. 4C is a schematic representation of a front view of the attachment/support member.
Figure 5A:
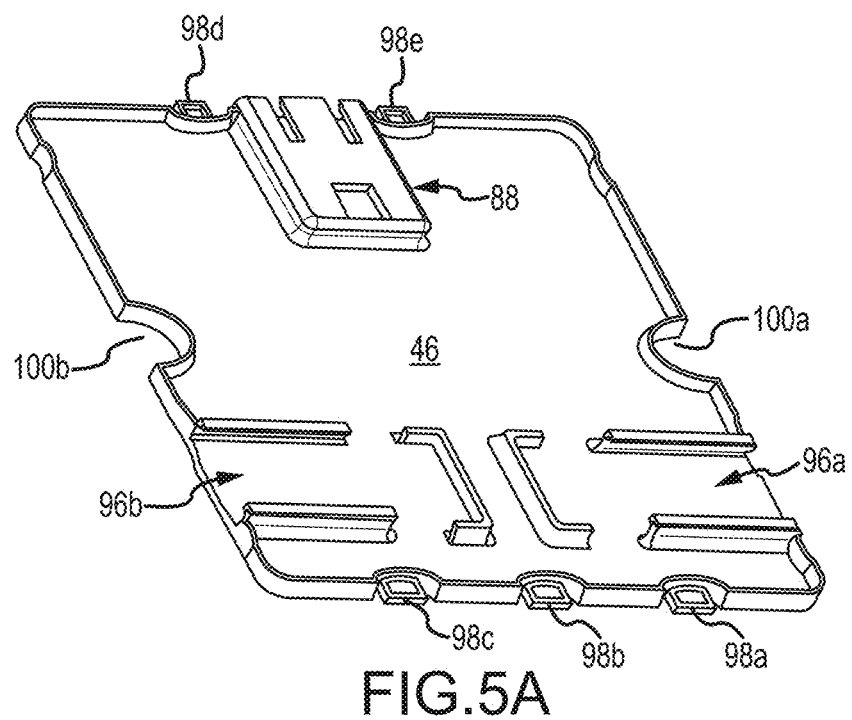

FIG. 4A is a schematic representation of a perspective top view of attachment/support member, 84, for removably affixing second lid 46 to either of molded tie-down slots, 22a, 22b of portable cooler 10, such that second lid 46 may be used as a cutting board. Shown are flexible detent, 86, for reversibly locking attachment/support member 84 to second lid 46, when forward portion, 87, of attachment/support member 84 is inserted into receptacle 88 of second lid 46 shown in FIG. 5A below, adapted to receive flexible detent 86. Foot, 90, fits snugly into tie-down slot 22a or 22b, and stabilizer, 92, is adapted to engage the outside of first lip or flange 24 of portable cooler 10, thereby providing a firm support for second lid 46 on cooler 10, whereby it can be utilized as a cutting board. FIG. 4B is a schematic representation of a side view of attachment/support member 84, illustrating optional braces, 94a, 94b, which may be added to stabilize attachment/support member 84. Attachment/support member 84 may be constructed from plastic or metal, and may be removed from cooler 10 for storage in slots, 96a, 96b, provided for this purpose on the bottom of second lid 46, as illustrated in FIG. 5A below. FIG. 4C is a schematic representation of a front view of attachment/support member 84.

Figure 5B:
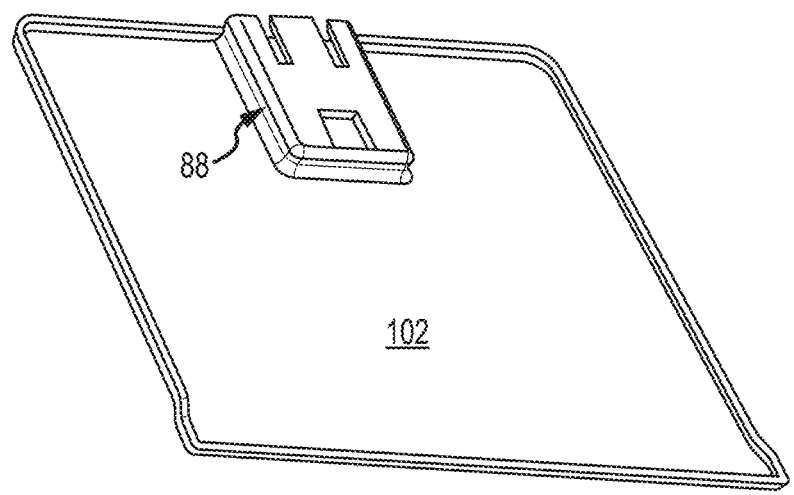
FIG. 5B is a schematic representation of a bottom perspective view of a second cutting board having an identical receptacle for mounting onto the unused tie-down slot using a second attachment/support member.

FIG. 5A is a schematic representation of a perspective bottom view of second lid 46, showing tabs 98a-98e, for securing second lid 46 to the top of cooler insert 32, finger depressions 100a, 100b for assisting a user in raising and removing second lid 46, storage slots 96a, 96b, for storing attachment/support member 84, and receptacle, 88. Second lid 46 may be made from the same plastic as cooler insert 32, or another suitable material, such as silicone, high density polypropylene, or metal, such as aluminum. Receptacle 88 may be formed near the edge of second lid during the molding process therefor, or attached thereto using plastic cement, epoxy or another suitable adhesive. FIG. 5B shows a schematic representation of a bottom perspective view of second cutting board, 102, having an identical receptacle 88 for mounting onto the unused tie-down slot 22a, 22b using a second attachment/support member 84, stored in the unused slot 96a, 96b in second lid 46.

Figure 6A:
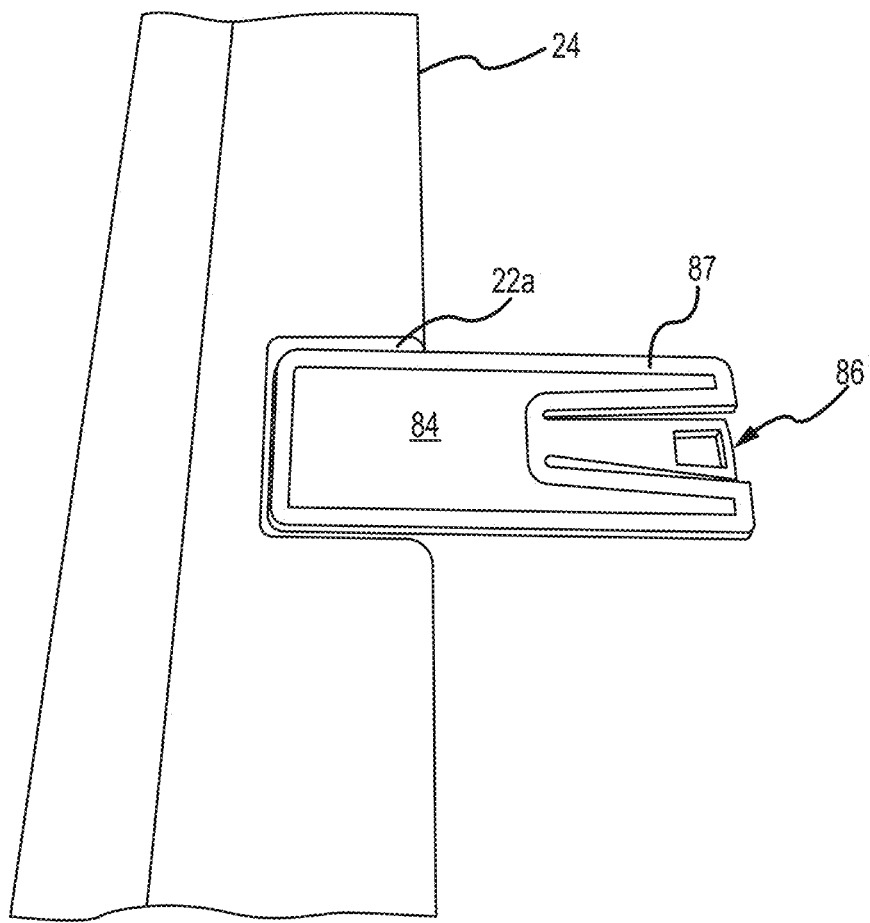
Figure 6B:
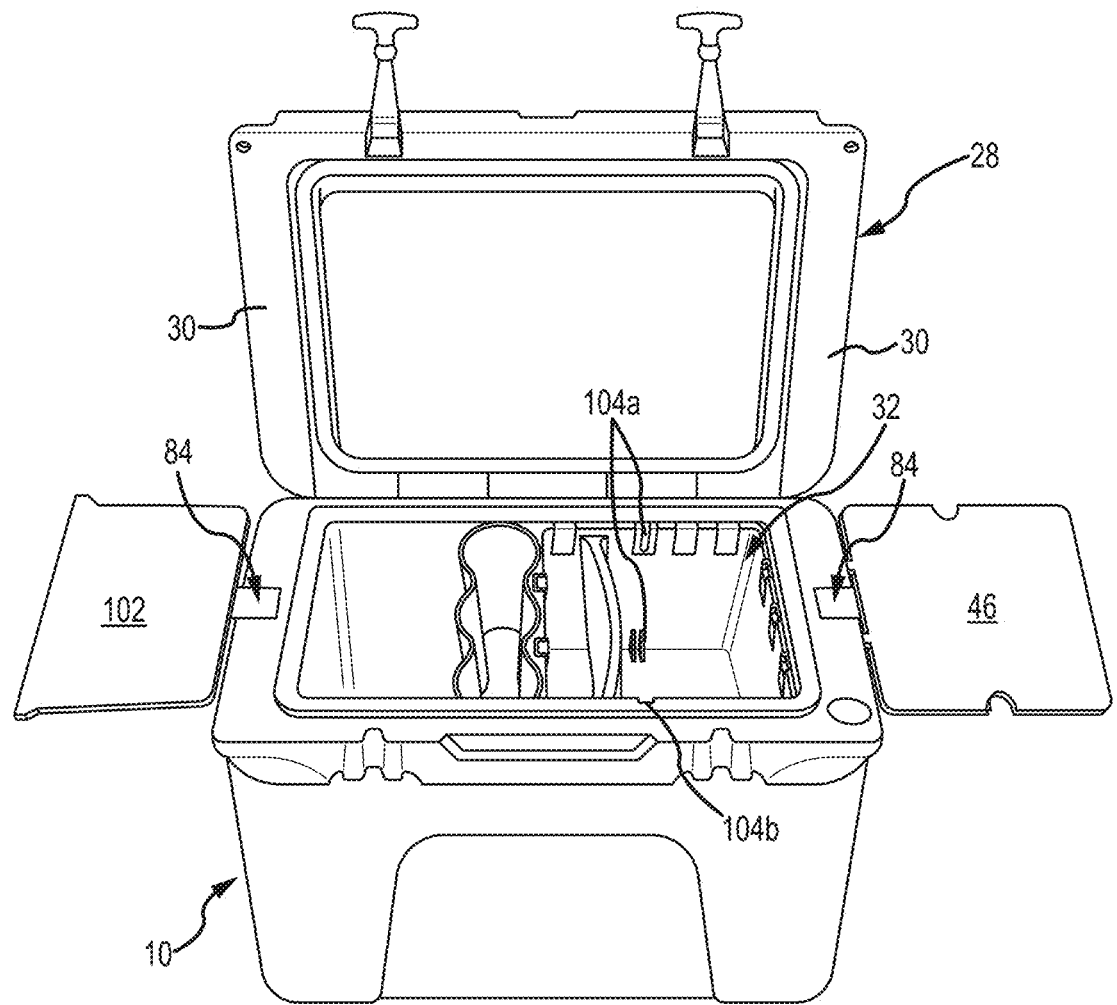
FIG. 6B is a schematic representation of perspective top view of the second lid and the second cutting board mounted on the portable cooler using attachment support members.

FIG. 6A is a schematic representation of a perspective top view of attachment/support member 84 inserted into one of the tie-down slots 22a, 22b of portable cooler 10, while FIG. 6B is a schematic representation of perspective top views of second lid 46 and second cutting board 102 mounted on portable cooler 10 using attachment support members 84. Second cutting board 102 may be stored in opposing slots 104a, 104b, formed in opposing walls of first chamber 34.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A hard cooler having:
   a closeable lid,
   a rectangular-shaped cooling volume with an open top covered by said lid, wherein said hard cooler comprises at least two opposing walls, each wall of the at least two opposing walls comprising a horizontal ledge internal to the cooling volume such that the horizontal ledge is parallel to and below the open top,
   a first lip or flange disposed at the open top, the first lip or flange having at least one molded tie-down slot formed in the first lip or flange, and
   a cooler insert comprising:
      a first chamber for containing items to be cooled, the first chamber comprising four attached or integrally formed walls, a first bottom member attached to or integrally formed with the walls, wherein a first volume is formed in the first chamber, the first chamber having an open top portion effective for providing liquid isolation between the first volume of the first chamber and the cooling volume of the cooler;
      a second chamber for containing ice, the second chamber comprising four attached or integrally formed walls, a second bottom member attached to or integrally formed with the walls of the second chamber, wherein a second volume is formed in the second chamber, the second chamber having an open top portion effective for providing liquid isolation between the second volume of the second chamber and the cooling volume of the cooler, said second chamber being spaced-apart by a chosen first distance from said first chamber to permit more effective cooling of said first chamber and said second chamber;
      a third chamber for holding cans or bottles, the third chamber comprising at least two vertically oriented cylindrically-shaped compartments tapered down toward the bottom, open at the top and bottom, and spaced-apart by a second chosen distance from said second chamber to permit more effective cooling thereof;
      a removable cover for covering the open top portions of said first chamber and said second chamber;
      an attachment or support member adapted to be inserted into the at least one tie-down slot and to be attached to said removable cover, whereby said removable cover is held in a horizontal orientation; and
      wherein a lip or flange is formed near the top of said cooler insert, said lip or flange adapted for resting on the horizontal ledges of said hard cooler.

2. The hard cooler of claim 1, wherein said first bottom member and said second bottom member are planar, said cooler insert further comprising a first thermally conductive metal plate attached to or integrally formed with said first bottom member and a second thermally conductive metal plate attached to or integrally formed with said second bottom member.

3. The hard cooler of claim 2, wherein said first thermally conductive metal plate and said second thermally conductive metal plate are covered with plastic.

* * * * *